United States Patent
Kawakami et al.

(10) Patent No.: US 7,538,806 B2
(45) Date of Patent: May 26, 2009

(54) SHADING CORRECTION METHOD AND SYSTEM AND DIGITAL CAMERA

(75) Inventors: Makoto Kawakami, Osaka (JP); Takahiro Iwasawa, Kyoto (JP); Kazuyuki Inokuma, Kyoto (JP); Keiichi Tsumura, Hyogo (JP); Katsumi Tokuyama, Osaka (JP); Toshiyuki Nakashima, Osaka (JP)

(73) Assignee: Panasonic Corporation, Osaka (JP)

( * ) Notice: Subject to any disclaimer, the term of this patent is extended or adjusted under 35 U.S.C. 154(b) by 956 days.

(21) Appl. No.: 10/790,699

(22) Filed: Mar. 3, 2004

(65) Prior Publication Data

US 2004/0174445 A1 Sep. 9, 2004

(30) Foreign Application Priority Data

Mar. 4, 2003 (JP) ............................. 2003-057384

(51) Int. Cl.
*H04N 9/64* (2006.01)
*G06K 9/40* (2006.01)

(52) U.S. Cl. ...................................... 348/251; 382/274

(58) Field of Classification Search ................. 348/241, 348/251, 187, 188; 382/254, 274
See application file for complete search history.

(56) References Cited

U.S. PATENT DOCUMENTS

| | | | | |
|---|---|---|---|---|
| 5,343,302 | A | * | 8/1994 | Yamashita ................... 348/251 |
| 5,818,523 | A | * | 10/1998 | Ban ......................... 348/224.1 |
| 6,940,546 | B2 | * | 9/2005 | Gallagher ................. 348/224.1 |
| 7,151,560 | B2 | * | 12/2006 | Matherson et al. ............ 348/187 |

FOREIGN PATENT DOCUMENTS

| | | | |
|---|---|---|---|
| JP | 06311425 | A * | 11/1994 |
| JP | 2000-41179 | A | 2/2000 |

* cited by examiner

*Primary Examiner*—Lin Ye
*Assistant Examiner*—Timothy J Henn
(74) *Attorney, Agent, or Firm*—McDermott Will & Emery LLP

(57) ABSTRACT

From horizontal and vertical coordinate values HC and VC of a pixel, a distance operation unit calculates a distance value RV indicating the distance from an optical-axis position to the pixel. A correction-data operation unit receives the distance value RV, and calculates correction data CD for the pixel by referring to an approximation function indicating relation between distance values and correction data. The approximation function is divided into a plurality of segments, and in each segment represented by a quadratic function defined by a predetermined number of sample points.

8 Claims, 8 Drawing Sheets

| Segment | Sample points |
|---|---|
| $I1\ (x_0 \leq x \leq x_2)$ | $(x_0, y_0)\ (x_1, y_1)\ (x_2, y_2)$ |
| $I2\ (x_2 \leq x \leq x_4)$ | $(x_2, y_2)\ (x_3, y_3)\ (x_4, y_4)$ |
| $I3\ (x_4 \leq x \leq x_6)$ | $(x_4, y_4)\ (x_5, y_5)\ (x_6, y_6)$ |
| $I4\ (x_6 \leq x \leq x_8)$ | $(x_6, y_6)\ (x_7, y_7)\ (x_8, y_8)$ |

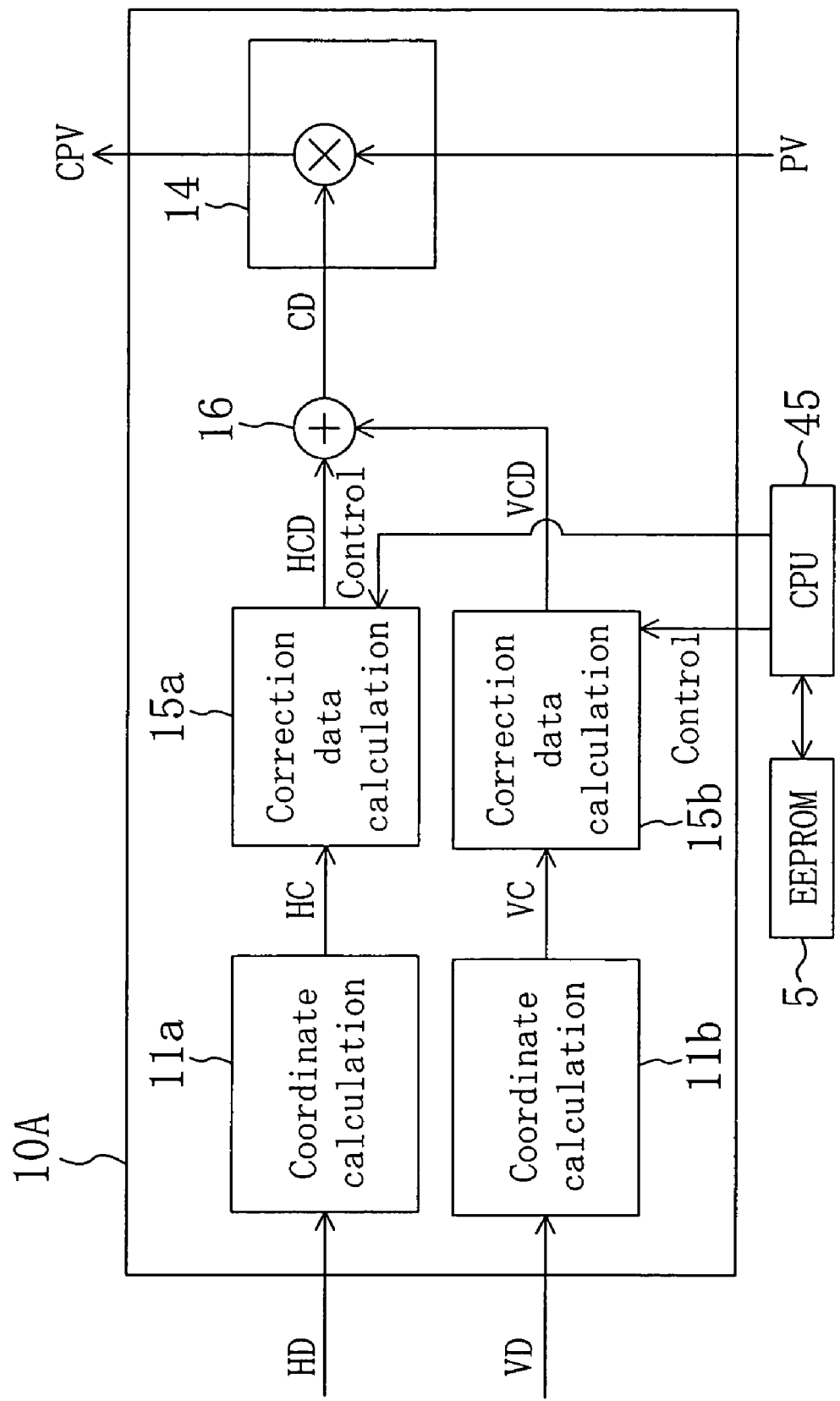

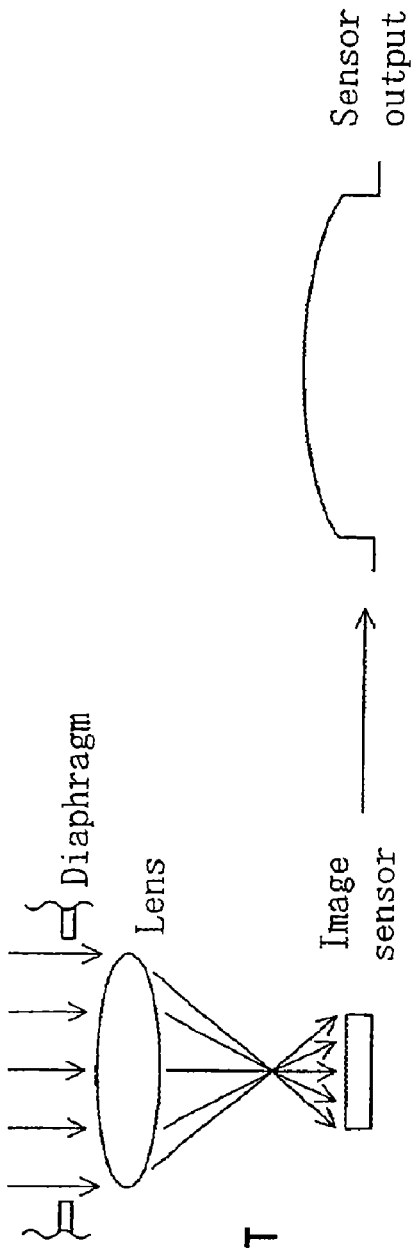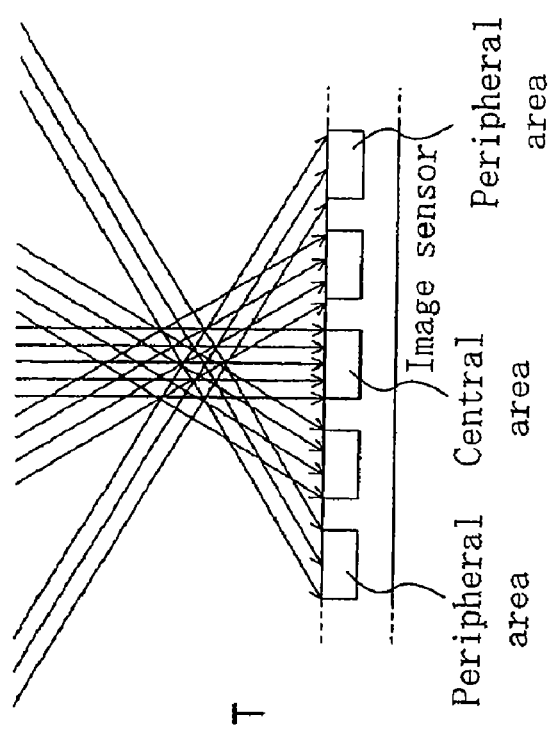
FIG. 7A PRIOR ART
FIG. 7B PRIOR ART

SHADING CORRECTION METHOD AND SYSTEM AND DIGITAL CAMERA

BACKGROUND OF THE INVENTION

The present invention pertains to technology of correcting lens shading in image data captured by a camera.

"Lens shading" is a phenomenon in which an image taken through an optical lens is bright in the center and darker toward the edges as shown in FIG. 7A. Such phenomenon results from decreases in the amount of light in the peripheral area of an image sensor as shown in FIG. 7B. Specifically, since light enters diagonally in the peripheral area, the amount of incident light per unit pixel is smaller as compared with the central area, causing the image to become dark in the edges. Due to lens shading, output from the image sensor decreases concentrically in the direction going toward the periphery, with an optical-axis position being as the center. Shading characteristics vary depending upon the camera diaphragm value, zoom position, type of lens, etc.

FIG. 8 is a block diagram illustrating an exemplary configuration of a conventional shading correction system. The configuration of FIG. 8 includes a ROM 53 in which correction data for shading correction is stored. An address generation block 51a generates an address in the horizontal direction from a horizontal synchronizing signal HD, while an address generation block 51b creates an address in the vertical direction from a vertical synchronizing signal VD. A radius operation block 52 squares the respective horizontal- and vertical-direction addresses and adds the resultant squares together, thereby calculating the square of the radius of the concentric circle that passes through the addresses, with the center of the circle being the optical-axis position. Subsequently, correction data that corresponds to the output value from the radius operation block 52 is read from the correction-data storing ROM 53. Gain control for the read correction data is then carried out by a gain controller 54. Based on the gain-controlled correction data, a correction processing block 55 corrects output from the image sensor.

Another prior art example includes a RAM in place of the ROM 53 in the configuration of FIG. 8.

Furthermore, disclosed in document 1 (Japanese Laid-Open Publication No. 2000-41179) is a configuration in which a plurality of ROMs 107, 108 and 109 that store therein shading-correction data are included, and a ROM-data switching unit 110 switches, based on a control signal outputted from an optical lens 101, the ROM data for use in correction.

Nevertheless, those prior art techniques suffer from the following problems.

First, in the configuration of FIG. 8, correction data for shading correction is stored in the ROM. This causes the shading-correction characteristics themselves to be fixed, making it difficult to perform shading correction to accord with characteristics of the optical system. By gain control, it is of course possible to make shading corrections corresponding to individual cases to a certain extent, but in practice that extent is not sufficient for corresponding to various kinds of products, such that gain-control shading correction cannot be applied widely. Furthermore, in addition to the ROM in which a large amount of correction data is stored, a radius operation unit for carry out square calculation, and a gain controller for performing gain control are necessary, which results in an increase in the circuit size.

Secondly, in the configuration in which a ROM is replaced by a RAM, since correction data can be updated easily, shading correction that conforms to characteristics of the optical system can also be realized easily. However, RAMs are larger in circuit size than ROMs. The circuit size of the configuration with a RAM is thus greater that that of the configuration of FIG. 8. Moreover, correction data has to be written into the RAM during system startup, requiring the system to take a long time to start operation.

Thirdly, the configuration disclosed in document 1 realizes shading correction that accords with characteristics of the optical system by including a plurality of ROMs. However, providing the plurality of ROMs, in which a large amount of correction data is stored, results in a larger circuit size as well as higher costs.

SUMMARY OF THE INVENTION

It is therefore an object of the present invention that shading correction can be performed by a small-size configuration accurately and flexibly to accord with characteristics of the optical system.

More specifically, in shading correction in accordance with the present invention, correction data for a pixel is obtained by referring to an approximation function that indicates relation between distance values from an optical-axis position and correction data. The approximation function used is divided into a plurality of segments, and represented in each segment by a quadratic function defined by a predetermined number of sample points.

This enables the correction data to be obtained just by giving data on the sample points for the corresponding segment. Therefore, unlike in the prior art configurations, a ROM or a RAM does not have to be provided, which allows the circuit size to be reduced as compared to the conventional cases. In addition, since the approximation function is divided into the plurality of segments, the desired correction characteristics can be approximated with high accuracy, resulting in the realization of fine correction. Furthermore, since correction characteristics can be changed just by updating data on the sample points for the segments, correction that accords with characteristics of the optical system can be easily realized. Moreover, if the approximation function is established to reflect gain control as well, a gain controller can be omitted for a further reduction in the circuit size.

Alternatively, instead of based on a distance value from the optical-axis position, based on coordinate values with respect to the optical-axis position, correction data in both the horizontal and vertical directions may be obtained by reference to approximation curves. Then, square calculation for obtaining the distance value can be omitted, thereby permitting a further reduction in the circuit size.

Specifically, a first invention is a method for correcting lens shading in image data captured by a camera. The inventive method includes the steps of: obtaining, for a pixel in the image data, a distance value indicating the distance from an optical-axis position to the pixel; from the obtained distance value, obtaining correction data for the pixel by reference to an approximation function that indicates relation between distance values and correction data for lens shading correction; and based on the obtained correction data, correcting a pixel value of the pixel. The approximation function is divided into a plurality of segments, and represented by quadratic functions in the respective segments. The quadratic functions are each defined by a predetermined number of sample points.

A second invention is a method for correcting lens shading in image data captured by a camera. The method includes the steps of: obtaining, for a pixel in the image data, a horizontal coordinate value and a vertical coordinate value with respect to an optical-axis position; from the obtained horizontal coordinate value, obtaining horizontal-direction correction data for the pixel by using a first approximation function that indicates relation between horizontal coordinate values and correction data for lens shading correction; from the obtained vertical coordinate value, obtaining vertical-direction correction data for the pixel by using a second approximation function that indicates relation between vertical coordinate values and correction data for lens shading correction; summing the horizontal-direction correction data and the vertical-direction correction data; and based on the correction data obtained by the summing operation, correcting a pixel value of the pixel. Each of the first and second approximation functions is divided into a plurality of segments, and represented by quadratic functions in the respective segments. The quadratic functions are each defined by a predetermined number of sample points.

In the first and second inventions, in the approximation function, or in each of the first and second approximation functions, the segments are preferably established so as to be relatively wide in a range closer to the optical-axis position, and to be relatively narrow in a range farther from the optical-axis position.

A third invention is a system for correcting lens shading in image data captured by a camera. The inventive system includes: a distance operation unit for obtaining, for a pixel in the image data, a distance value indicating the distance from an optical-axis position to the pixel; a correction-data operation unit for obtaining, from the distance value obtained by the distance operation unit, correction data for the pixel by reference to an approximation function that indicates relation between distance values and correction data for lens shading correction; and a correction unit for correcting a pixel value of the pixel based on the correction data obtained by the correction-data operation unit. The approximation function is divided into a plurality of segments, and represented by quadratic functions in the respective segments. The quadratic functions are each defined by a predetermined number of sample points. The correction-data operation unit receives data regarding the sample points for one of the segments to which the distance value belongs, and obtains the correction data in accordance with one of the quadratic functions that is defined by those sample points.

A fourth invention is a system for correcting lens shading in image data captured by a camera. The inventive system includes: first and second coordinate operation units for obtaining, for a pixel in the image data, respective horizontal and vertical coordinate values with respect to an optical-axis position; a first correction-data operation unit for obtaining, from the horizontal coordinate value obtained by the first coordinate operation unit, horizontal-direction correction data for the pixel by reference to a first approximation function that indicates relation between horizontal coordinate values and correction data for lens shading correction; a second correction-data operation unit for obtaining, from the vertical coordinate value obtained by the second coordinate operation unit, vertical-direction correction data for the pixel by reference to a second approximation function that indicates relation between vertical coordinate values and correction data for lens shading correction; an adder for summing the horizontal- and vertical-direction correction data obtained by the respective first and second correction-data operation units; and a correction unit for correcting a pixel value of the pixel based on correction data obtained by the adder. Each of the first and second approximation functions is divided into a plurality of segments, and represented by quadratic functions in the respective segments. The quadratic functions are each defined by a predetermined number of sample points. The first correction-data operation unit receives data regarding the sample points for one of the segments to which the horizontal coordinate value belongs, and obtains the correction data in accordance with one of the quadratic functions that is defined by those sample points, while the second correction-data operation unit receives data regarding the sample points for one of the segments to which the vertical coordinate value belongs, and obtains the correction data in accordance with one of the quadratic functions that is defined by those sample points.

A fifth invention is a digital camera including: a shading correction system of the third or fourth invention, and a rewritable memory in which the data regarding the sample points is stored.

BRIEF DESCRIPTION OF THE DRAWINGS

FIG. 3A is a view indicating relation between an optical-axis position and coordinate values in image data. FIG. 3B is a wave-form chart indicating input into, an inner waveform in, and output from, a coordinate operation unit.

FIG. 5 is a block diagram illustrating the configuration of a shading correction system in accordance with a second embodiment of the present invention.

FIG. 7A is a view for explaining "lens shading".

FIG. 7B illustrates the results of shading

DESCRIPTION OF THE PREFERRED EMBODIMENTS

Hereinafter, preferred embodiments of the present invention will be described with reference to the accompanying drawings.

First Embodiment

Figure 1:
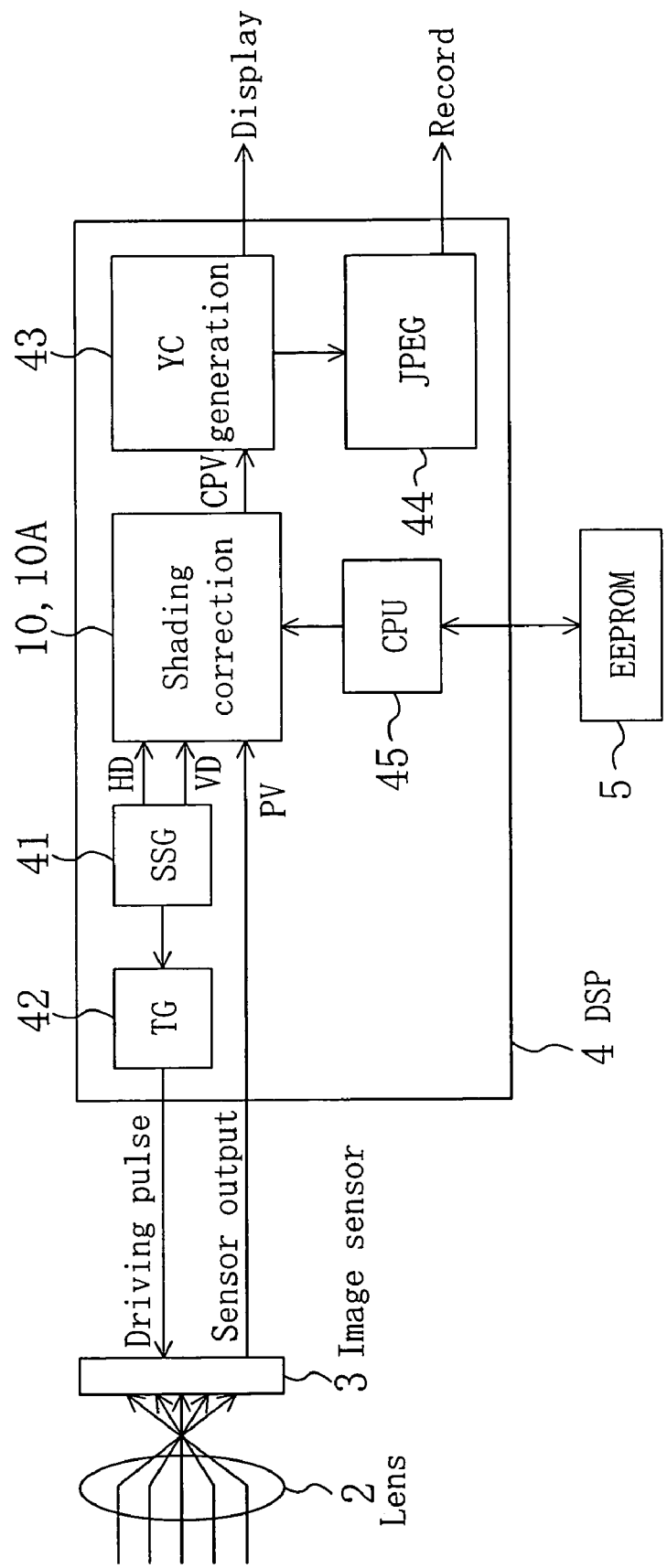
FIG. 1 is a block diagram illustrating the configuration of a digital camera in accordance with an embodiment of the present invention.

FIG. 1 is a block diagram illustrating an exemplary system configuration of a digital camera in accordance with the present invention. A digital camera 1 shown in FIG. 1 includes a lens 2, an image sensor 3, a DSP (digital signal processor) 4 having a shading correction block 10, 10A, and an EEPROM (electrically erasable and programmable ROM) 5 for storing therein parameters for shading correction.

The DSP 4 is provided with a SSG (sync signal generator) 41, a TG (timing generator) 42, a YC generator 43, and a JPEG portion 44. The SSG 41 generates a synchronizing signal. The TG 42 receives the synchronizing signal and supplies a driving pulse to the image sensor 3. The YC generator 43 produces a brightness signal (Y) and a color signal (C) from output from the image sensor 3 in which shading has been corrected. The JPEG portion 44 compresses the brightness and color signals outputted from the YC generator 43. The output signals from the YC generator 43 are displayed on a liquid crystal monitor, for example, while output signals from the JPEG portion 44 are recorded on a storage medium such as a memory card. A CPU 45 controls correction processing in the shading correction block 10, 10A based on the parameters stored in the EEPROM 5.

Figure 2:
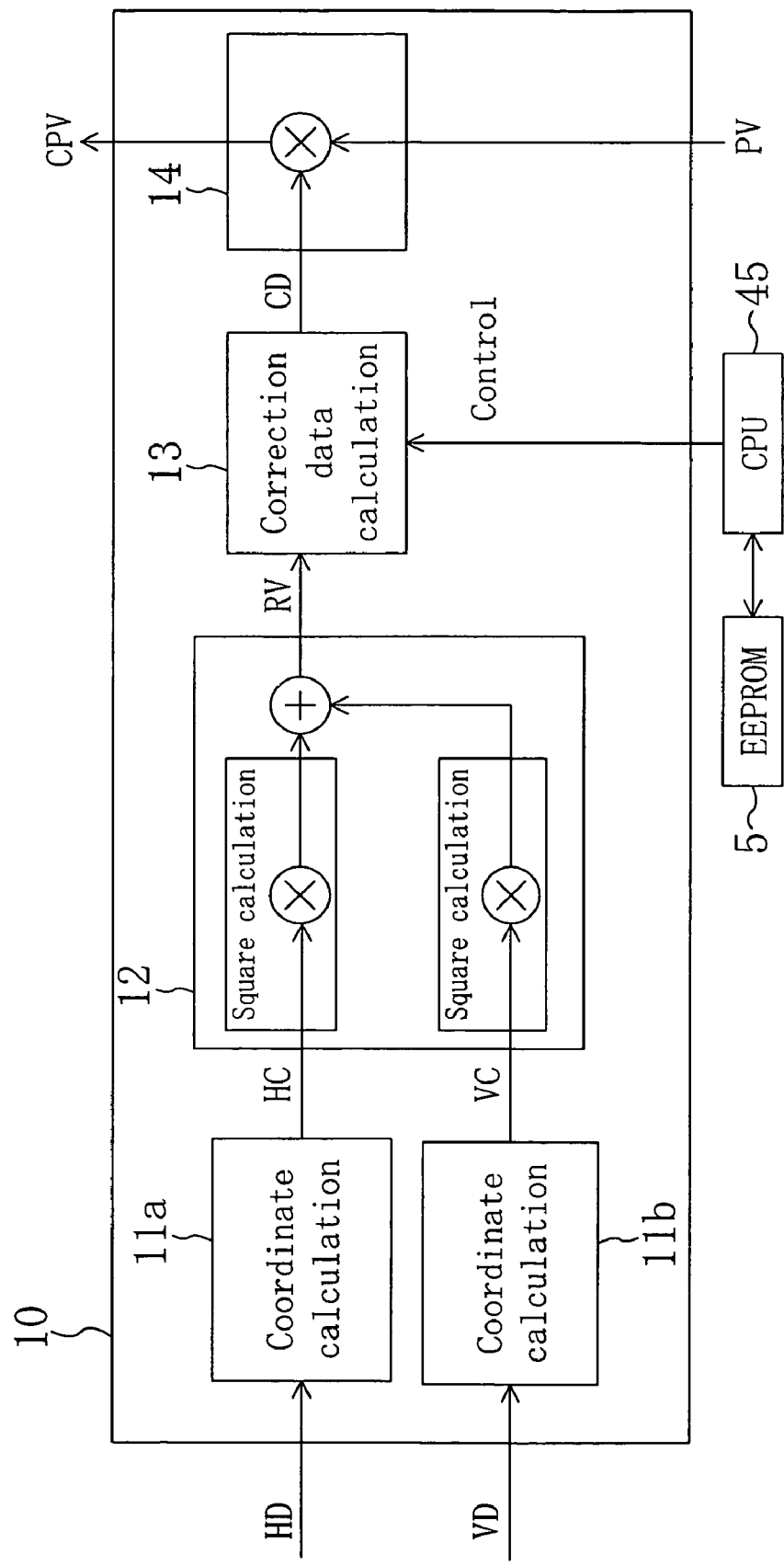
FIG. 2 is a block diagram illustrating the configuration of a shading correction system in accordance with a first embodiment of the present invention.

FIG. 2 is a block diagram illustrating the internal configuration of the shading correction block 10 serving as a shading correction system in accordance with this embodiment. The shading correction block 10 of FIG. 2 receives a horizontal synchronizing signal HD and a vertical synchronizing signal VD outputted from the SSG 41, corrects a pixel value P from the image sensor 3, and outputs the corrected value as a corrected pixel value CPV.

Figure 3A:
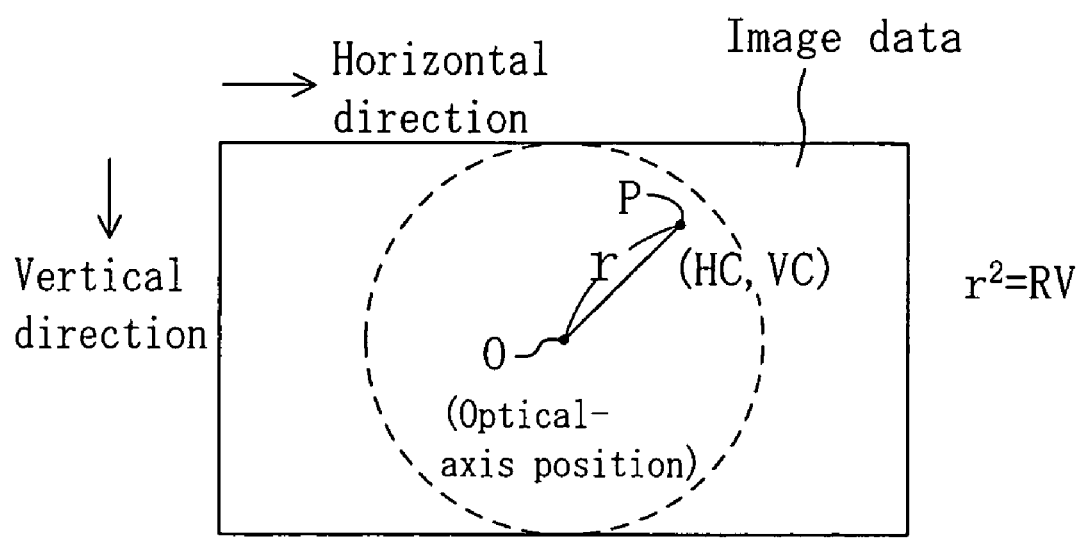
FIGS. 3A and 3B are views for explaining how the shading correction system of FIG. 2 operates.
Figure 3B:
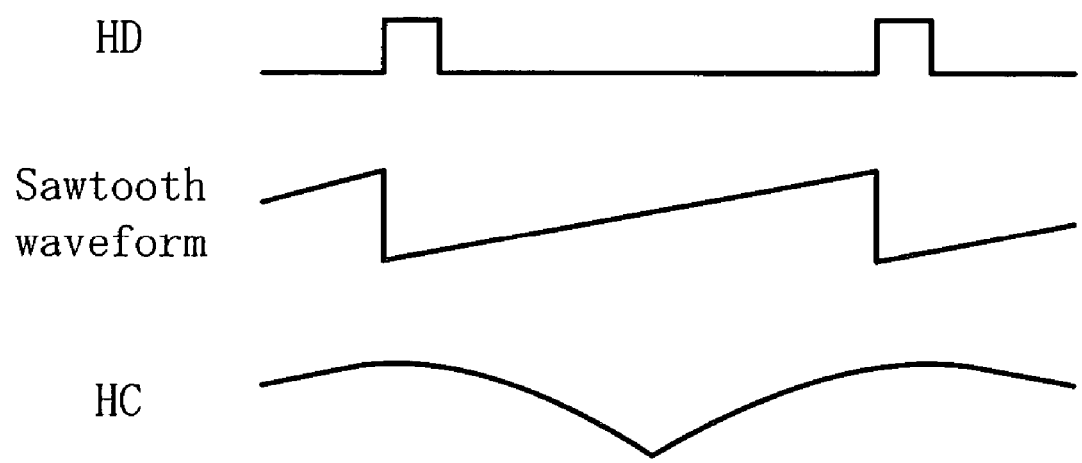

Referring to FIG. 3, how the shading correction block 10 of FIG. 2 operates will be described. First, upon receipt of the respective horizontal and vertical synchronizing signals HD and VD, first and second coordinate operation units 11a and 11b calculate the horizontal and vertical coordinate values HC and VC of a pixel. As shown in FIG. 3A, the obtained coordinate values HC and VC are relative coordinate values in the image data with respect to the optical-axis position of the lens 2. More specifically, as shown in FIG. 3B, upon the receipt of the horizontal synchronizing signal HD, the first coordinate operation unit 11a produces therein a sawtooth waveform, and generates the relative coordinate value HC based on that sawtooth wave. The second coordinate operation unit 11b operates likewise.

From the horizontal and vertical coordinate values HC and VC, a distance operation unit 12 calculates a distance value RV regarding a distance from the optical-axis position. In this embodiment, the distance operation unit 12 outputs as the distance value RV the value obtained by squaring the respective coordinate values HC and VC and then adding those squares together, that is, the value equal to the square of a distance r shown in FIG. 3A.

Upon receiving the distance value RV, a correction-data operation unit 13 calculates correction data CD for the pixel. The calculation performed by the correction-data operation unit 13 will be described later. The correction-data operation unit 13 is composed of a logic circuit and a register, for example. A correction unit 14 multiplies the pixel value PV by the correction data CD, thereby producing the corrected pixel value CPV.

Next, how the correction-data operation unit 13 operates will be discussed in detail. The correction-data operation unit 13 refers to an approximation function that indicates relation between distant values and correction data for lens shading correction, and obtains the correction data CD based on the provided distant value RV.

Figures 4A, 4B:
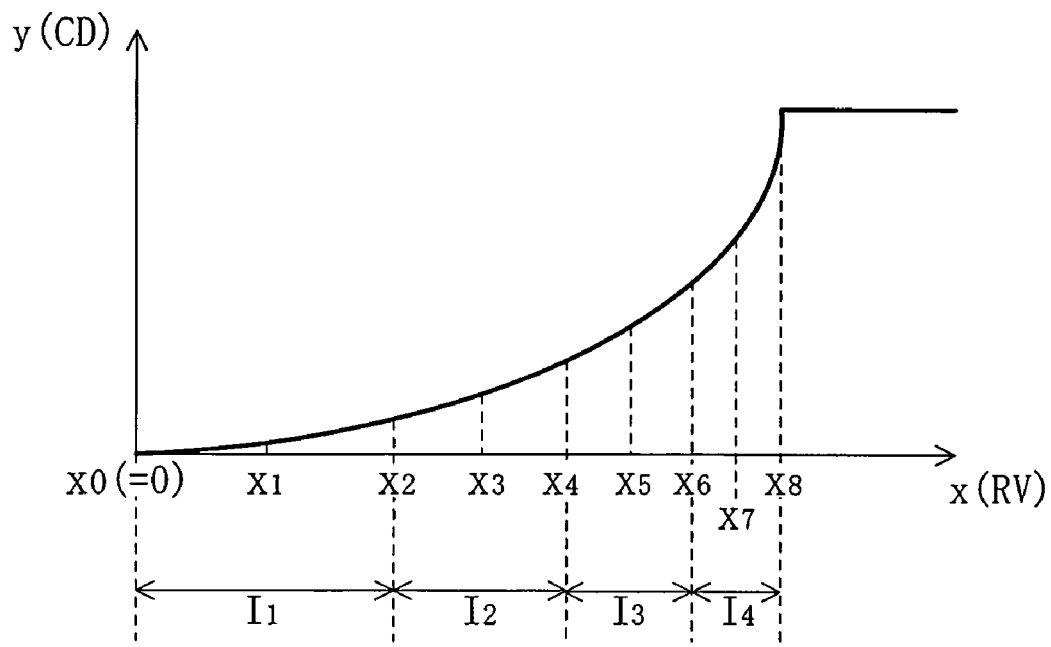
FIG. 4 is a graph indicating an example of a function used for shading correction.

FIG. 4 is a graph indicating an example of the approximation function for obtaining correction data. In this embodiment, the x-axis indicates the distant value RV, while the y-axis represents the correction data CD. The function of FIG. 4 is divided into a plurality of segments (four segments 11 through 14 in this embodiment), and in each of the segments 11 through 14, a quadratic function defined by three sample points represents the approximation function.

For instance, in the segment 11 (x0≦x≦x2), the following equation including the three sample points (x0, y0), (x1, y1) and (x2, y2) defines a quadratic function.

$$y=y1+(y2-y0)(x-x1)/2N1+(y0+y2-2y1)(x-x1)^2/2N1^2 \quad (1)$$

where N1=x1−x0=x2−x1.

Likewise, in the segment I2 (x2≦x≦x4), the following equation including the three sample points (x2, y2), (x3, y3) and (x4, y4) defines a quadratic function.

$$y=y3+(y4-y2)(x-x3)/2N2+(y2+y4-2y3)(x-x3)^2/2N2^2 \quad (2)$$

where N2=x3−x2=x4−x3.

In this manner, since the approximation function for creating correction data is divided into the plurality of segments, the desired correction characteristics can be approximated with high accuracy, so that fine shading-correction that conforms to characteristics of the optical system can be performed. Furthermore, in the function of FIG. 4, the widths of the segments are set relatively large in the range in which the value of "x" is small, that is, in the range located closer to the optical-axis position, while they are set relatively smaller as the value of "x" increases, that is, as the distance from the optical axis increases. Shading caused by a lens becomes manifest in the direction going toward the periphery. Therefore, finer shading-correction can be performed by establishing the segment widths in such a manner that they are relatively wide in the range closer to the optical-axis position, while being relatively narrow in the range farther from the optical-axis position.

In this embodiment, data regarding the sample points for defining the quadratic functions is stored beforehand in the EEPROM 5 serving as a rewritable memory. From the distance value RV, the CPU 45 designates the segment to which the distance value RV belongs, reads from the EEPROM 5 data on the sample points for that designated segment, and supplies the read data to the correction-data operation unit 13. The correction-data operation unit 13 temporarily stores the supplied sample-point data in an internal register, and executes mathematical operations such as the equations (1) and (2) to obtain the correction data CD.

As has been mentioned above, in this embodiment, correction data can be calculated just by providing data regarding sample points that define the approximation function. Therefore, fine shading-correction that accords with characteristics of the optical system can be performed without a correction-data-storing ROM or RAM such as included in the conventional configurations. This allows the circuit size to be reduced significantly as compared to the prior art configurations. Moreover, since the coordinates of the sample points are stored in a rewritable memory such as the EEPROM 5, it is easy to correspond to individual optical-system characteristics. Furthermore, the approximation function can be established to reflect gain control as well, so that a gain controller such as seen in the prior art configuration does not have to be provided, thereby permitting a further reduction in the circuit size.

Second Embodiment

FIG. 5 is a block diagram illustrating the inner configuration of the shading correction block 10A, which is a shading correction system in accordance with a second embodiment of the present invention. In FIG. 5, the same members as those shown in FIG. 2 are designated by the same reference numerals.

In the first embodiment, correction data is calculated from the distance from the optical-axis position. In this embodiment, horizontal-direction correction data HCD and vertical-direction correction data VCD are respectively obtained from a horizontal coordinate value HC and a vertical coordinate value VC with respect to the optical-axis position, and then the correction data HCD and VCD are added together to obtain correction data CD.

More specifically, in the configuration of FIG. 5, a first correction-data operation unit 15a refers to a first approximation function that indicates relation between horizontal coordinate values and correction data for lens-shading correction, and obtains horizontal-direction correction data HCD based on a provided horizontal coordinate value HC. A second correction-data operation unit 15b refers to a second approximation function that indicates relation between vertical coordinate values and correction data for lens-shading correction, and obtains vertical-direction correction data VCD based on a provided vertical coordinate value VC. An adder 16 then adds the horizontal- and vertical-direction correction data HCD and VCD together, and outputs the result as the correction data CD.

Figure 6:
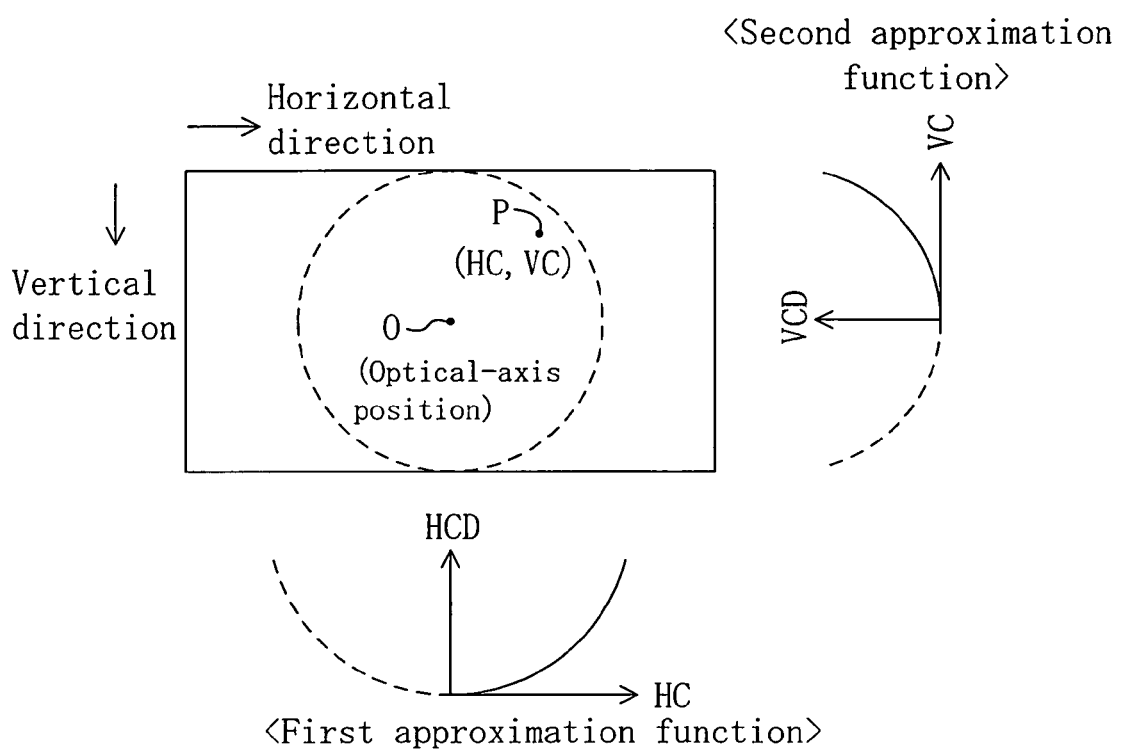
FIG. 6 is a view indicating relation between image data and first and second approximation functions.
Figure 8:
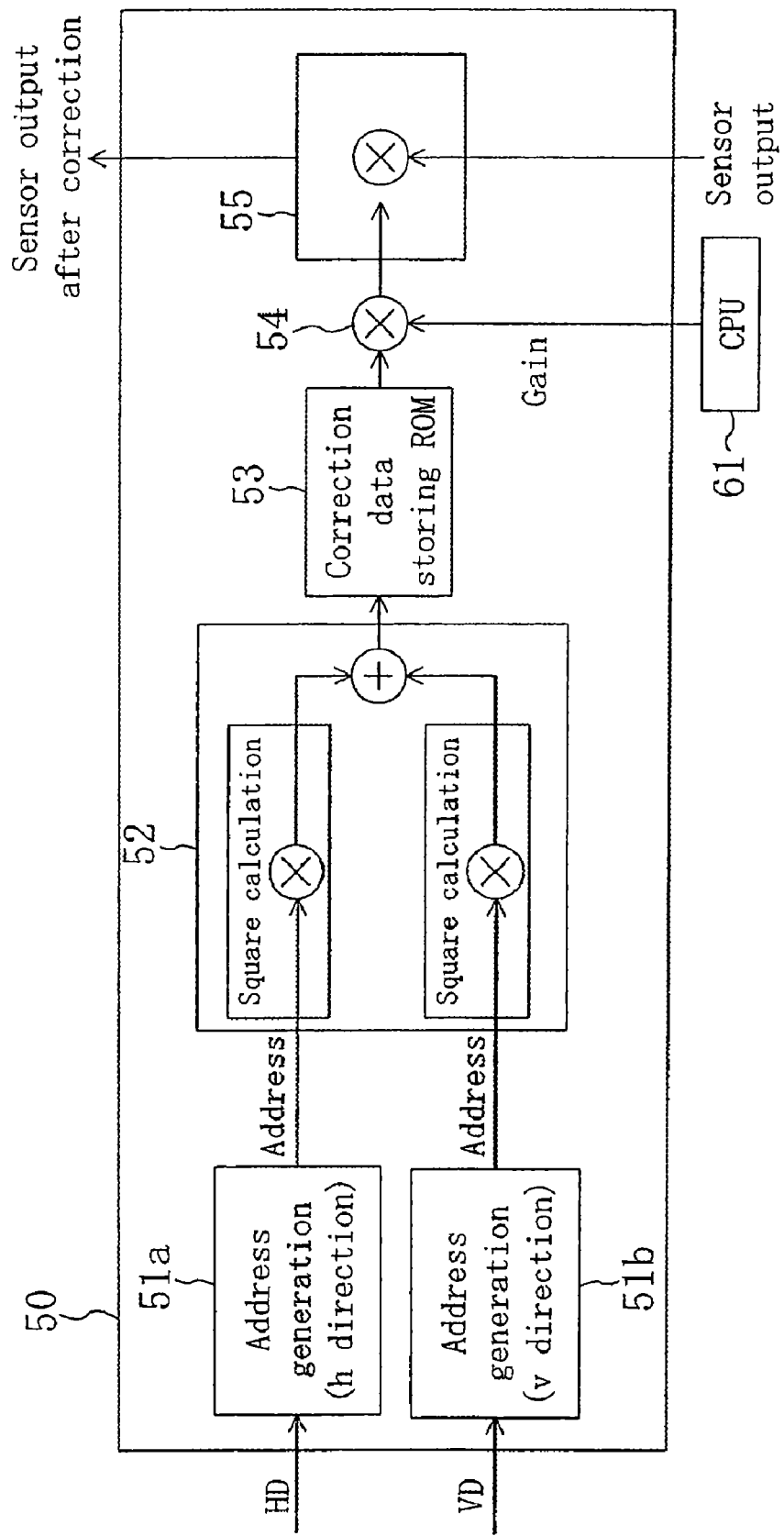
FIG. 8 is a block diagram illustrating an exemplary configuration of a conventional shading correction system.

FIG. 6 is a view indicating relation between image data and the first and second approximation functions. Each of the first and second approximation functions is divided into a plurality of segments as shown in FIG. 4, and represented in each segment by a quadratic function defined by three sample points. In the first approximation function, the x-axis represents the horizontal coordinate value HC, and the y-axis indicates the horizontal-direction correction data HCD. In the second approximation function, the x-axis indicates the vertical coordinate value VC, and the y-axis represents the vertical-direction correction data VCD. Data regarding the sample points for defining the first and second approximation functions may be stored beforehand in an EEPROM 5 as in the first embodiment.

As compared to the first embodiment, the circuit size is decreased further in this embodiment, since a distance operation unit 12 for performing square calculation is not necessary. The number of sample points to be prepared is about twice as that of the first embodiment, which however causes no particular problem, because the amount of data is small in the first place.

Hereinafter, a supplementary explanation of the setting of the first and second approximation functions will be given.

As in this embodiment, when correction data for both the horizontal and vertical directions is obtained, ideal shading correction can be performed in the horizontal and vertical directions with respect to the optical-axis position. However, such correction is not necessarily ideal in oblique directions with respect to the optical-axis position.

More specifically, in lens shading, pixel values decrease concentrically and uniformly in the direction going from the optical-axis position toward the periphery. Therefore, it is ideal that the first and second approximation functions be quadratic functions that include only second order terms. If zeroth and first order terms are included, correction characteristics are not concentric in the oblique directions.

For this reason, it is desirable that after the first and second approximation functions have been established so as to allow ideal shading correction to be realized in the horizontal and vertical directions, data regarding the sample points be corrected in such a manner that the coefficients of the zeroth and first order terms approach zero. Then, ideal shading correction can be realized in terms of the oblique directions as well.

It should be noted that in setting an approximation function, the number of sample points provided for defining a quadratic function in each segment may also be other than three. However, three sample points are sufficient for the definition of each quadratic function.

Although the foregoing embodiments describe examples in which shading correction blocks are configured in terms of hardware, the present invention is not limited to this, but the all or part of the functions, for example, may be realized by software. More specifically, the present invention is effective in any configurations, so long as such configurations can realize a shading correction method, in which a distance value indicating a distance from an optical-axis position, or coordinate values with respect to the optical-axis position are obtained for a pixel in image data; correction data is obtained from the obtained distance value or coordinate values by referring to (an) approximation function(s) such as mentioned above; and the pixel value of the pixel is corrected based on the obtained correction data.

As described above, in the present invention, since correction data can be obtained just by giving data regarding the sample points for the corresponding segment of the approximation function, the circuit size can be decreased as compared to the conventional cases, while correction characteristics can be changed easily, thereby enabling the realization of correction that accords with characteristics of the optical system.

What is claimed is:

1. A method for correcting lens shading in image data captured by a camera, the method comprising the steps of:

obtaining, for a pixel in the image data, a distance value indicating the distance from an optical-axis position to the pixel;

from the obtained distance value, obtaining correction data for the pixel by reference to an approximation function that indicates relation between distance values and correction data for lens shading correction; and based on the obtained correction data, correcting a pixel value of the pixel, wherein the approximation function is divided into a plurality of segments, and represented by quadratic functions in the respective segments, the quadratic functions each being defined by a predetermined number of sample points.

2. The method of claim 1, wherein in the approximation function, the segments are established so as to be relatively wide in a range closer to the optical-axis position, and to be relatively narrow in a range farther from the optical-axis position.

3. A method for correcting lens shading in image data captured by a camera, the method comprising the steps of:

obtaining, for a pixel in the image data, a horizontal coordinate value and a vertical coordinate value with respect to an optical-axis position;

from the obtained horizontal coordinate value, obtaining horizontal-direction correction data for the pixel by using a first approximation function that indicates relation between horizontal coordinate values and correction data for lens shading correction;

from the obtained vertical coordinate value, obtaining vertical-direction correction data for the pixel by using a second approximation function that indicates relation between vertical coordinate values and correction data for lens shading correction;

summing the horizontal-direction correction data and the vertical-direction correction data; and based on the correction data obtained by the summing operation, correcting a pixel value of the pixel, wherein each of the first and second approximation functions is divided into a plurality of segments, and represented by quadratic functions in the respective segments, the quadratic functions each being defined by a predetermined number of sample points.

4. The method of claim 3, wherein in each of the first and second approximation functions, the segments are established so as to be relatively wide in a range closer to the optical-axis position, and to be relatively narrow in a range farther from the optical-axis position.

5. A system for correcting lens shading in image data captured by a camera, the system comprising:

a distance operation unit for obtaining, for a pixel in the image data, a distance value indicating the distance from an optical-axis position to the pixel;

a correction-data operation unit for obtaining, from the distance value obtained by the distance operation unit, correction data for the pixel by reference to an approximation function that indicates relation between distance values and correction data for lens shading correction; and a correction unit for correcting a pixel value of the pixel based on the correction data obtained by the correction-data operation unit, wherein the approximation function is divided into a plurality of segments, and represented by quadratic functions in the respective segments, the quadratic functions each being defined by a predetermined number of sample points; and the correction-data operation unit receives data regarding the sample points for one of the segments to which the distance value belongs, and obtains the correction data in accordance with one of the quadratic functions that is defined by those sample points.

6. A system for correcting lens shading in image data captured by a camera, the system comprising:

first and second coordinate operation units for obtaining, for a pixel in the image data, respective horizontal and vertical coordinate values with respect to an optical-axis position;

a first correction-data operation unit for obtaining, from the horizontal coordinate value obtained by the first coordinate operation unit, horizontal-direction correction data for the pixel by reference to a first approximation function that indicates relation between horizontal coordinate values and correction data for lens shading correction;

a second correction-data operation unit for obtaining, from the vertical coordinate value obtained by the second coordinate operation unit, vertical-direction correction data for the pixel by reference to a second approximation function that indicates relation between vertical coordinate values and correction data for lens shading correction;

an adder for summing the horizontal- and vertical-direction correction data obtained by the respective first and second correction-data operation units; and a correction unit for correcting a pixel value of the pixel based on correction data obtained by the adder, wherein each of the first and second approximation functions is divided into a plurality of segments, and represented by quadratic functions in the respective segments, the quadratic functions each being defined by a predetermined number of sample points; and the first correction-data operation unit receives data regarding the sample points for one of the segments to which the horizontal coordinate value belongs, and obtains the correction data in accordance with one of the quadratic functions that is defined by those sample points, while the second correction-data operation unit receives data regarding the sample points for one of the segments to which the vertical coordinate value belongs, and obtains the correction data in accordance with one of the quadratic functions that is defined by those sample points.

7. A digital camera comprising:
a shading correction system of claim 5, and
a rewritable memory in which the data regarding the sample points is stored.

8. A digital camera comprising:
a shading correction system of claim 6, and
a rewritable memory in which the data regarding the sample points is stored.

* * * * *